US009452648B2

(12) United States Patent
Hunt

(10) Patent No.: US 9,452,648 B2
(45) Date of Patent: Sep. 27, 2016

(54) TRAILER EXTENSION APPARATUS AND METHOD

(71) Applicant: William J. Hunt, Wonderlake, IL (US)

(72) Inventor: William J. Hunt, Wonderlake, IL (US)

( * ) Notice: Subject to any disclaimer, the term of this patent is extended or adjusted under 35 U.S.C. 154(b) by 101 days.

(21) Appl. No.: 14/205,185

(22) Filed: Mar. 11, 2014

(65) Prior Publication Data

US 2014/0250660 A1  Sep. 11, 2014

Related U.S. Application Data

(60) Provisional application No. 61/776,339, filed on Mar. 11, 2013.

(51) Int. Cl.
*B60D 1/145* (2006.01)
*B60D 1/42* (2006.01)
*B60D 1/06* (2006.01)

(52) U.S. Cl.
CPC ............... *B60D 1/145* (2013.01); *B60D 1/06* (2013.01); *B60D 1/42* (2013.01); *Y10T 29/49826* (2015.01)

(58) Field of Classification Search
CPC ................... B60D 1/06; B60D 1/145
See application file for complete search history.

(56) References Cited

U.S. PATENT DOCUMENTS

| 3,155,399 | A | * | 11/1964 | Fetzko | B60P 3/1083 280/482 |
| 3,385,610 | A | * | 5/1968 | Vezina | B60P 3/1083 280/482 |
| 4,407,519 | A | * | 10/1983 | Heyser | B60P 3/1083 280/414.1 |
| 5,011,177 | A | * | 4/1991 | Grice | B60P 3/1083 280/482 |
| 6,302,425 | B1 | * | 10/2001 | Springer | B60P 3/1083 114/344 |
| 2007/0227432 | A1 | * | 10/2007 | Imbergamo | B60P 3/1083 114/249 |
| 2012/0234884 | A1 | * | 9/2012 | Witmer | B60D 1/58 224/520 |

* cited by examiner

*Primary Examiner* — Kevin Hurley
(74) *Attorney, Agent, or Firm* — Cardinal Law Group

(57) ABSTRACT

Embodiments of the invention relate to an extension apparatus and method for attaching to a trailer tongue having a trailer hitch defining a first plane. The apparatus comprises a suspension bar defining a second plane and has a proximal end and a distal end, a ball adapted to be removably received in the trailer hitch and positioned between the suspension bar proximal and distal ends and a block positioned on the suspension bar distal end. A first extension portion defines a third plane and has a proximal end and a distal end, the first extension portion proximal end defines an opening adapted to removably receive the block, and the first extension distal end having a trailer hitch adapted to removably engage a ball on a vehicle. A permanent receiver mount is adapted to removably engage at least one of the trailer tongue and the suspension bar.

13 Claims, 8 Drawing Sheets

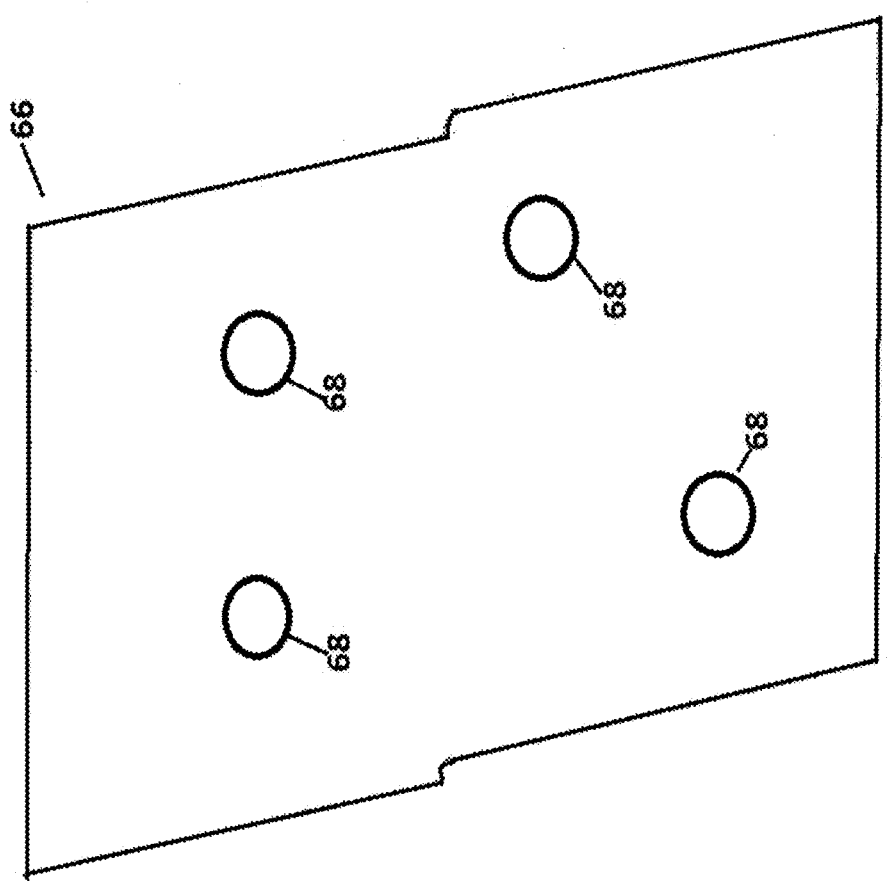

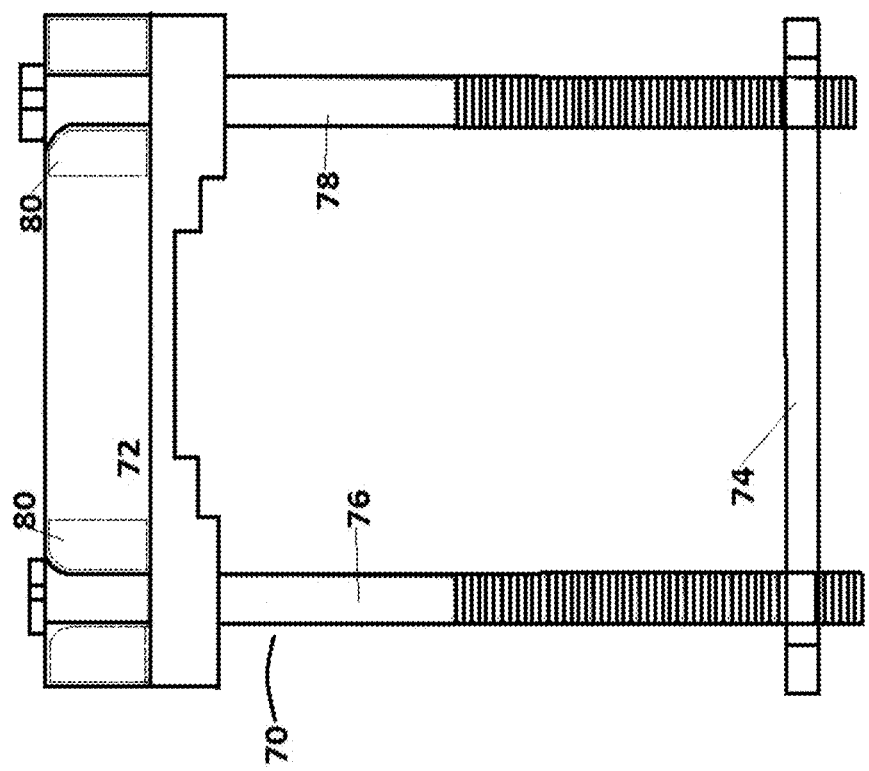

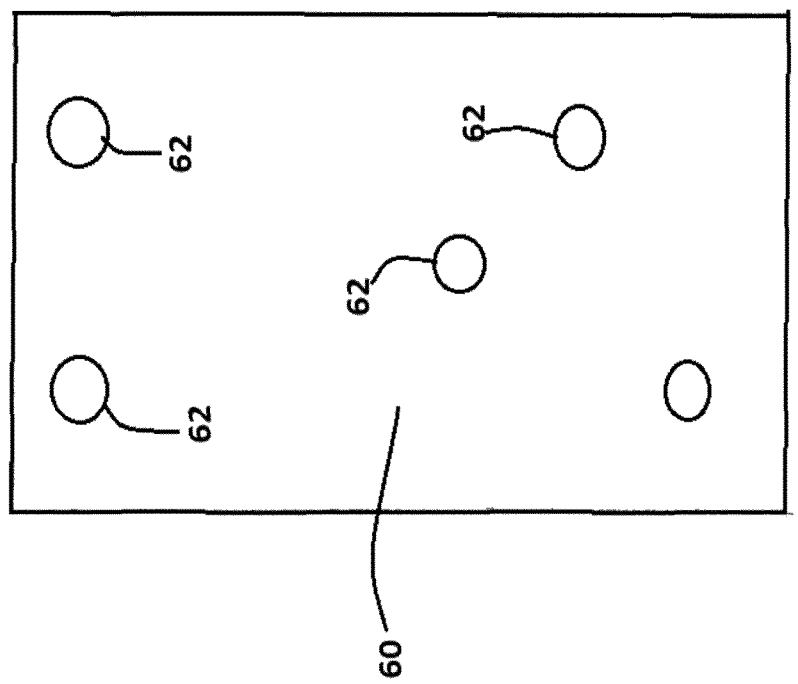

TRAILER EXTENSION APPARATUS AND METHOD

CLAIM FOR PRIORITY

The present application claims the benefit of Provisional Application No. 61/776,339 filed Mar. 11, 2013 and titled "TRAILER EXTENSION APPARATUS AND METHOD" the complete subject matter of which is incorporated herein by reference.

FIELD OF THE INVENTION

The invention relates to an extension apparatus and method. More particularly, the invention relates to an extension apparatus and method used with a trailer tongue.

BACKGROUND OF THE INVENTION

It is well known to many small boat enthusiasts who tow their boats on a trailer to a lake or other water body, that there are some places the towing vehicle cannot get close enough to the water for launching the boat from the trailer, Therefore it is a laborious task to move the trailer close to the water to launch the boat. This situation is, of course, objectionable and is therefore, in want of an improvement.

Accordingly, it is a principal object of the present invention to provide a trailer tongue extension that allows the trailer to get to the water while the towing vehicle remains a safe distance away on dry land.

Yet another object is to provide a trailer tongue extension which is quick and effortless to extend or retract, and which can be used to either launch a boat or to pull it from the water.

Another object is to increase the length of the trailer tongue, preventing jackknifing while backing up while at the same time improving visibility (i.e., improving the site lines of the towed item) while backing up.

Other objects are to provide a trailer tongue extension which is simple in design, inexpensive to manufacture, rugged in construction, easy to use and efficient in operation.

These and other objects will be readily evident upon a study of the following specification and the accompanying drawings.

SUMMARY OF THE INVENTION

Embodiments of the invention relate to an apparatus and method attaching to a trailer tongue having a trailer coupler.

One embodiment relates to an extension apparatus for attaching to a trailer tongue having a trailer coupler defining a first plane. The apparatus comprises a suspension bar defining a second plane and has a proximal end and a distal end, a ball adapted to be removably received in the trailer coupler and positioned between the suspension bar proximal and distal ends and a block positioned on the suspension bar distal end. A first extension portion defines a third plane and has a proximal end and a distal end, the first extension portion proximal end defines an opening adapted to removably receive the block, and the first distal end having an extension coupler adapted to removably engage a ball on a vehicle. A semi-permanent receiver mount is adapted to removably engage at least one of the trailer tongue and the suspension bar.

Another embodiment relates to an extension apparatus for attaching to a trailer tongue having a trailer coupler defining a first plane. The apparatus includes a suspension bar defining a second plane different from the first end and having a proximal end and a distal end, a ball adapted to be removably received in the trailer coupler and positioned between the suspension bar proximal and distal ends and a block positioned on the suspension bar distal end. The first extension portion defines a third plane co-planar with the first plane and having a proximal end and a distal end, the first extension portion proximal end defining an opening adapted to removably receive the block, and the first extension distal end having a extension coupler adapted to removably engage a ball on a vehicle. A second extension portion having a proximal end and a distal end, the second extension proximal end adapted to removably receive the box and the second extension distal end adapted to removably engage the first extension portion proximal end. A semi-permanent receiver mount is adapted to removably engage at least one of the trailer tongue and the suspension bar.

Another embodiment relates to a method for extending a trailer tongue using an extension apparatus, the trailer tongue having a trailer coupler defining a first plane. The extension apparatus comprises a suspension bar defining a second plane and having a proximal end, a distal end, a ball positioned between the suspension bar proximal and distal ends, and a block positioned on the suspension bar distal end. A first extension portion defines a third plane and has a proximal end and a distal end, the first extension portion proximal end defining an opening and the extension portion distal end having an extension coupler. The extension apparatus further includes a semi-permanent receiver mount. The method comprises removably attaching the permanent receiver mount to at least one of the trailer tongue and the suspension bar; and placing the ball in the trailer coupler on the trailer tongue. The block is removably placed in the opening of the extension portion proximal end; and engages a ball mounted on a vehicle using the trailer coupler on the extension portion distal end.

The foregoing and other features and advantages of the invention will become further apparent from the following detailed description of the presently preferred embodiment, read in conjunction with the accompanying drawings. The drawings are not to scale. The detailed description and drawings are merely illustrative of the invention rather than limiting, the scope of the invention being defined by the appended claims and equivalents thereof.

BRIEF DESCRIPTION OF THE DRAWINGS

FIG. 6 depicts the permanent receiver mount of FIG. 1 in accordance with one embodiment;

FIG. 7 depicts another view of the temporary receiver mount similar to that of FIG. 4 in accordance with one embodiment; and FIG. 8 depicts a semi-permanent receiver of the extension apparatus of FIG. 1 in accordance with one embodiment.

Throughout the various figures, like reference numbers refer to like elements.

DETAILED DESCRIPTION OF PRESENTLY PREFERRED EMBODIMENTS

Figure 1:
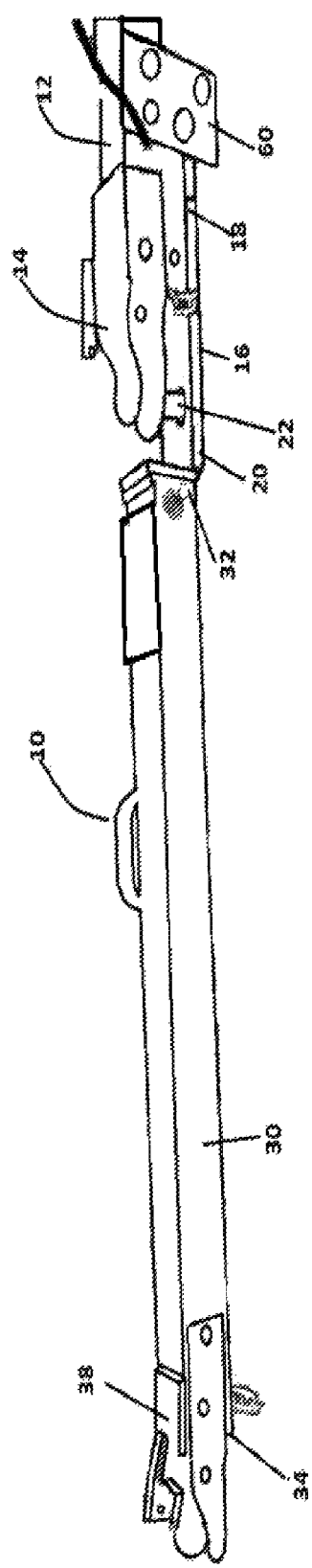
FIG. 1 depicts an extension apparatus in accordance with one embodiment of the present invention.

One embodiment relates to an extension apparatus, generally designated 10, for removably attaching to a trailer tongue 12 having a trailer coupler 14, the trailer tongue 12 defining a first plane.

One embodiment of the extension apparatus 10 is illustrated in FIGS. 1-8. The apparatus includes a suspension bar 16 defining a second plane. The extension bar 16 has a proximal end 18 and a distal end 20, and a ball 22 adapted to be removably received in the trailer coupler 14 and positioned between the suspension bar proximal and distal ends 18 and 20. In at least one embodiment, the suspension bar 16 has a block 24 positioned on the suspension bar distal end 20. One exemplary embodiment of the suspension bar 16 is a cold rolled bar approximately 20" in length, ⅝" thick and 3" wide, although other length, widths and thicknesses are contemplated. The block 24 is a steel block 4½" in length, 1.625" thick and 1.625" wide, although other length, widths and thicknesses are contemplated. At least a portion of the block 24 is welded to the suspension bar 16. Ball 22 is spaced about 3½" from one end of the block 24.

FIGS. 1-3 & 5 further illustrate an extension portion 30 defining a third plane. Extension portion 30 has a proximal end 32 and a distal end 34, the extension portion proximal end defining at least one opening 36 at proximal end 32 adapted to removably receive the block 24. Extension portion 30 further includes an extension coupler 38 at distal end 34 adapted to removably engage a ball on a towing vehicle. One exemplary embodiment of the extension portion 30 is a 2" by 2" structural tube approximately 4' in length, where the tube is about 3/16" thick, although other length, widths and thicknesses are contemplated.

Figure 2:
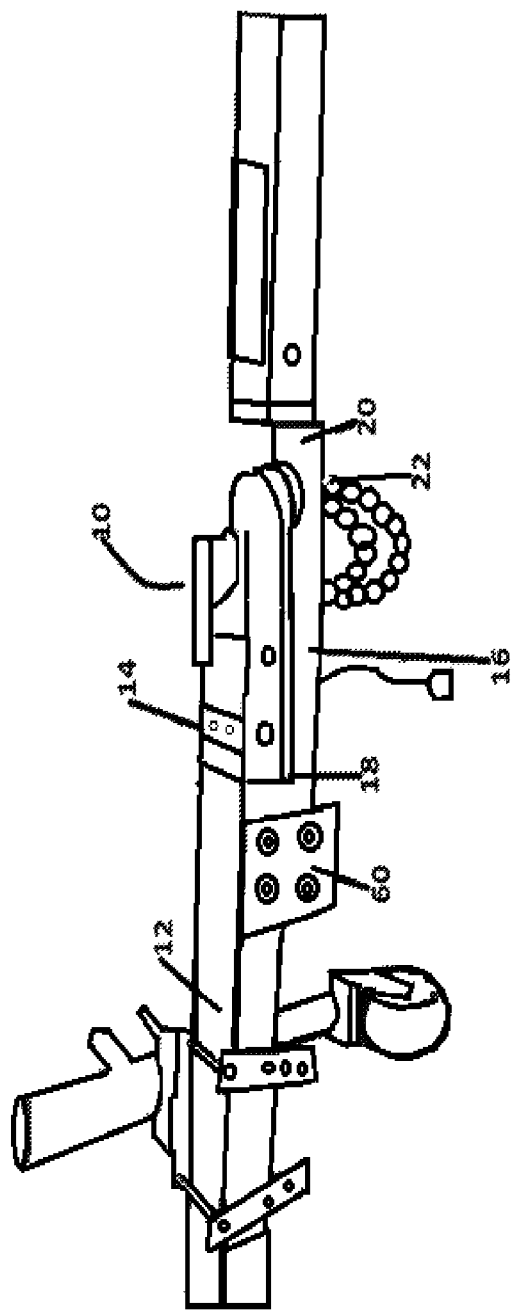
FIG. 2 depicts the extension bar of FIG. 1 in accordance with one embodiment of the present invention.
Figure 3:
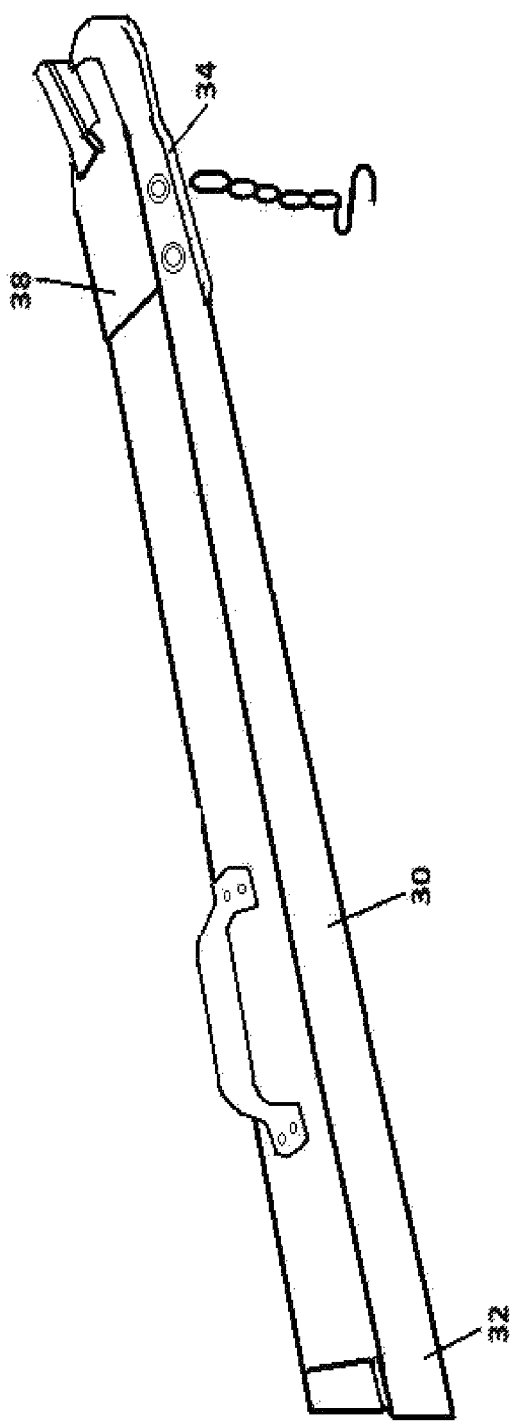
FIG. 3 depicts the extension portion of the extension apparatus of FIG. 1 in accordance with one embodiment of the present invention.

FIG. 2 further illustrates the extension apparatus 10 includes a second extension portion 40 having a proximal end 42, distal end 44, and a block 46 at distal end 44. In at least one embodiment, the proximal end 42 is adapted to removably receive the block 24 and the block 36 at distal end 44 is adapted to removably engage the extension portion proximal end 32. One exemplary embodiment of the second extension portion 40 is a structural tube approximately 4' in length having a 1⁵⁄₄₀" inch inner diameter. Block 46 is about 6" in length, 1.625" thick and 1.625" wide, although other length, widths and thicknesses are contemplated. In at least one embodiment, block 46 is spot welded to second extension portion 40 about 1½" from distal end 44.

Figure 4:
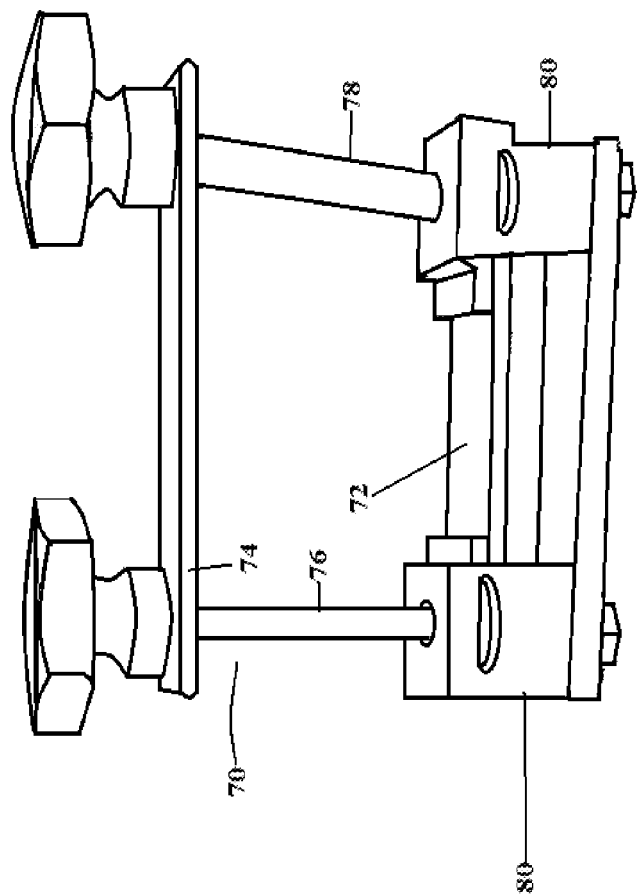
FIG. 4 depicts the temporary receiver mount of the extension apparatus of FIG. 1 in accordance with one embodiment.
Figure 5:
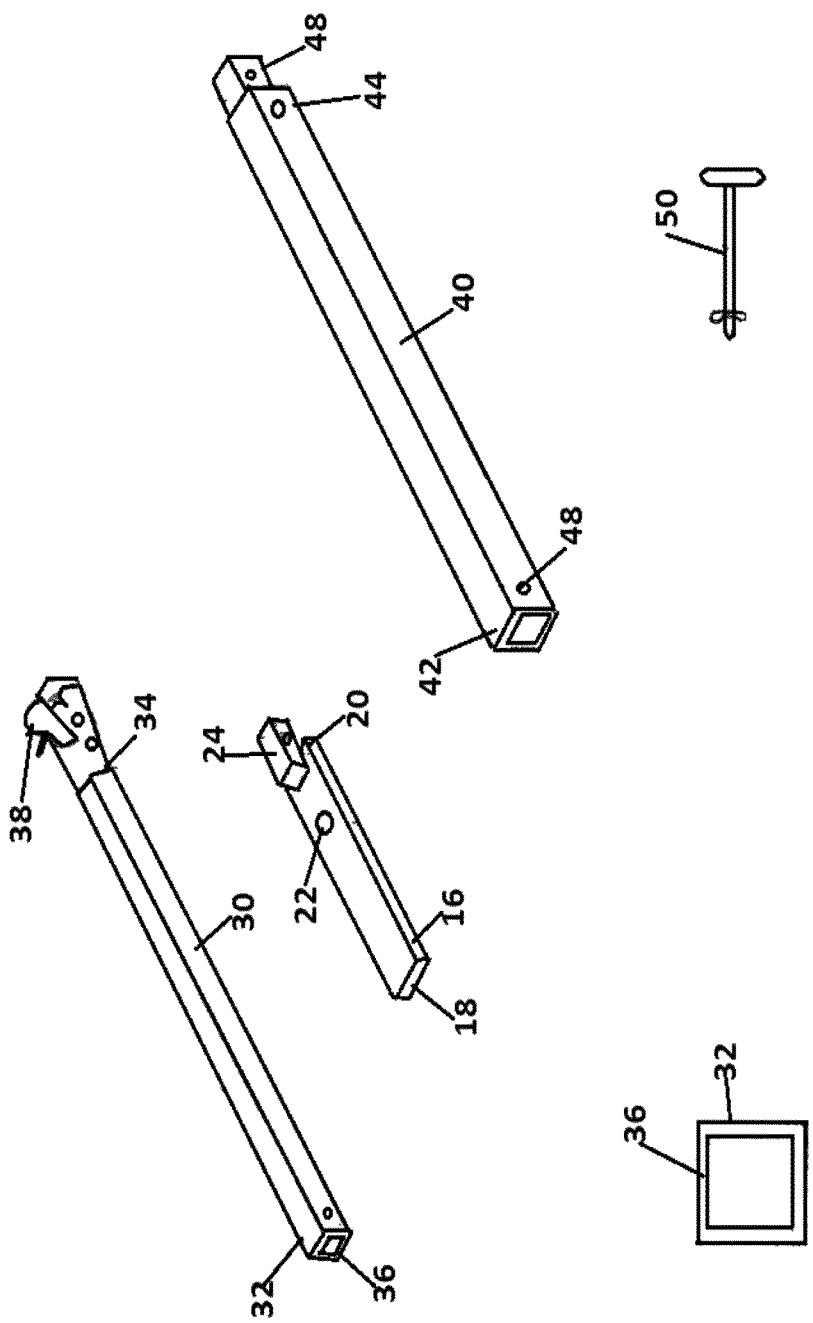
FIG. 5 is an exploded view of the extension apparatus of FIG. 1 in accordance with one embodiment of the present invention.

FIG. 4 illustrates a universal, temporary receiver mount, generally designated 70, adapted to removably attach a support member to the extension portion without requiring tools. In the illustrated embodiment, the temporary receiver mount 70 includes at least two steel plates 72 and 74, spaced apart from and generally parallel to each other, and two bolts 76 and 78, spaced apart from and generally parallel to each other. One or more spaces 80 are illustrated spaced apart about 3" and about ½" in length.

FIG. 6 illustrates one embodiment of a permanent receiver mount, generally designated 66. In the illustrated embodiment, the permanent receiver mount 66 is a steel plate is about 6" in length, 4 wide and ¼" thick, although other length, widths and thicknesses are contemplated, and defining one or more holes 68. In the illustrated embodiment, one or more of the holes 68 are about ½" in diameter. One or more of the holes 68 are spaced about 1" from one edge, one or more holes 68 are spaced 1½" from one edge and one or more holes 68 are spaced 1¾" from one end. As illustrated, permanent receiver mount 66 is substantially rectangular in shape having one or more cutouts approximately 3" long and ⅛" wide.

FIG. 7 illustrates a universal, temporary receiver mount, generally designated 70, adapted to removably attach a support member to the extension portion without requiring tools. In the illustrated embodiment, the temporary receiver mount 70 includes at least two steel plates 72 and 74, spaced apart from and generally parallel to each other, and two bolts 76 and 78, spaced apart from and generally parallel to each other. Steel plate 72 is about 6" in length and about ¾" thick defining one or more holes to receive bolts 76 and 78, and having one or more cutouts between 2" and 3" in length and adapted to receive different sized support members, although other length, widths and thicknesses are contemplated. Steel plate 74 is about 6" in length and about ¼" thick and defines one or more holes for receiving bolts 76 and 78. Bolts 76 and 78 are spaced about 4" apart and each bolt has threads extending up about 4" of its length. One or more spaces 80 are illustrated spaced apart about 3" and about ½" in length.

FIG. 8 illustrates one embodiment of a semi-permanent receiver, generally designated 60 adapted to be coupled or connected to one or both of the trailer tongue 12 and the suspension bar 16. In the illustrated embodiment, the semi-permanent receiver 60 is a generally rectangular steel plate about 7" in length, 4 wide and ¼' thick, although other length, widths and thicknesses are contemplated, and defining one or more holes 62. In the illustrated embodiment, one or more of the holes 62 are about ½" in diameter. Two of the holes 62 are spaced about 1" from one edge and ½" from another edge and 2" from each other, one or more holes 62 are spaced 4¼" from one edge and 2" from another edge, one or more holes 62 are spaced 1" from one edge and about 1⅝" from another edge, and one or more holes 62 is spaced about 1" from at least one edge. As illustrated, semi-permanent receiver 60 has a 1/16" outward taper along at least a portion of one edge.

Another embodiment relates to a method for extending a trailer tongue 12 using an extension apparatus 10, where the trailer tongue 12 has a trailer coupler 14 defining a first plane. The extension apparatus 10 comprises a suspension bar 16 defining a second plane and having a proximal end, a distal end, a ball positioned between the suspension bar proximal and distal ends, and a block positioned on the suspension bar distal end.

A first extension portion 30 defines a third plane and has a proximal end 32 and a distal end 34, the first extension portion proximal end 32 defining an opening and the extension portion distal end 34 having an extension coupler 38. The extension apparatus further includes a semi-permanent receiver mount. The method comprises removably attaching the permanent receiver mount to at least one of the trailer tongue and the suspension bar; and placing the ball in the trailer coupler on the trailer tongue. The block 46 is removably placed in the opening of the extension portion proximal end; and engages a ball mounted on a vehicle using the trailer coupler on the extension portion distal end.

In operative use, it is now evident in case a towing vehicle cannot get close enough to a water so to launch or lift a boat between a trailer and the water, the trailer tongue extension is in place to keep the towed boat a predetermined distance away from the towing vehicle, preventing jackknifing when backing and keeping the boat in the driver's line of site.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

I claim:

1. An extension apparatus for attaching to a trailer tongue having a trailer coupler defining a first plane, the apparatus comprising:
   a suspension bar defining a second plane and having a proximal end and a distal end, a ball adapted to be removably received in the trailer coupler and positioned between the suspension bar proximal end and distal end and a block positioned on the suspension bar distal end;
   a first extension portion defining a third plane and having a proximal end and a distal end, the first extension portion proximal end defining an opening adapted to removably receive the block, and the first extension distal end having a extension coupler adapted to removably engage a ball on a vehicle; and
   a receiver mount adapted to removably engage at least one of the trailer tongue and the suspension bar.

2. The extension apparatus of claim 1 further comprising a second extension portion having a proximal end and a distal end, the second extension proximal end adapted to removably receive the box and the second extension distal end adapted to removably engage the extension portion proximal end.

3. The extension apparatus of claim 1 wherein the first and third planes are co-planar and the second plane is different from the first and third planes.

4. The extension apparatus of claim 1 wherein the first extension portion defines at least one hole and the suspension bar distal end defines at least one hole adapted to line up with the at least one hole in the first extension portion and removably receive a pin.

5. The extension apparatus of claim 1 further comprising a universal, temporary receiver mount adapted to removably attach a support member to the first extension portion without requiring tools.

6. An extension apparatus for attaching to a trailer tongue having a trailer coupler defining a first plane, the apparatus comprising:
   a suspension bar defining a second plane different from the first end and having a proximal end and a distal end, a ball adapted to be removably received in the trailer coupler and positioned between the suspension bar proximal and distal ends and a block positioned on the suspension bar distal end;
   a first extension portion defining a third plane co-planar with the first plane and having a proximal end and a distal end, the first extension portion proximal end defining an opening adapted to removably receive the block, and the first extension distal end having a extension coupler adapted to removably engage a ball on a vehicle;
   a second extension portion having a proximal end and a distal end, the second extension proximal end adapted to removably receive the box and the second extension distal end adapted to removably engage the first extension portion proximal end, and
   a receiver mount adapted to removably engage at least one of the trailer tongue and the suspension bar.

7. The extension apparatus of claim 6 wherein the extension portion defines at least one hole and the suspension bar distal end defines at least one hole adapted to line up with the at least one hole in the extension portion and removably receive a pin.

8. The extension apparatus of claim 6 further comprising a universal, temporary receiver mount adapted to removably attach a support member to the extension portion without requiring tools.

9. A method for extending a trailer tongue using an extension apparatus, the trailer tongue having a trailer hitch defining a first plane comprising:
   the extension apparatus comprising:
      a suspension bar defining a second plane and having a proximal end, a distal end, a ball positioned between the suspension bar proximal and distal ends, and a block positioned on the suspension bar distal end;
      an extension portion defining a third plane and having a proximal end and a distal end, the extension portion proximal end defining an opening and the distal end having a trailer hitch; and
      a receiver mount;
   the method comprising: removably attaching the permanent receiver mount to at least one of the trailer tongue and the suspension bar; placing the ball in the trailer hitch on the trailer tongue;
   removably placing the block in the opening of the extension portion proximal end; and engaging a ball mounted on a vehicle using the trailer hitch on the extension portion distal end.

10. The method of claim 9 further comprising a second extension portion having a proximal end and a distal end, the second extension proximal end removably receiving the box and the second extension distal end removably engaging the extension portion proximal end.

11. The method of claim 9 wherein the first and third planes are co-planar and the second plane is different from the first and third planes.

12. The method of claim 9 wherein the first extension portion defining at least one hole and the suspension bar distal end defining at least one hole that lines up with the at least one hole in the first extension portion and removably receives a pin.

13. The method of claim 9 further comprising a universal, temporary receiver mount removably attaching a support member to the extension portion without requiring tools.

* * * * *